(12) United States Patent
Hamana et al.

(10) Patent No.: US 8,428,402 B2
(45) Date of Patent: Apr. 23, 2013

(54) OPTICAL TRANSMISSION MODULE, ELECTRONIC DEVICE, AND METHOD FOR MANUFACTURING OPTICAL TRANSMISSION MODULE

(75) Inventors: Kentaro Hamana, Kusatsu (JP); Ryo Yamamoto, Kyoto (JP); Naru Yasuda, Uji (JP); Hayami Hosokawa, Kyoto (JP)

(73) Assignee: OMRON Corporation, Kyoto (JP)

( * ) Notice: Subject to any disclaimer, the term of this patent is extended or adjusted under 35 U.S.C. 154(b) by 241 days.

(21) Appl. No.: 13/029,834

(22) Filed: Feb. 17, 2011

(65) Prior Publication Data

US 2011/0222815 A1 Sep. 15, 2011

(30) Foreign Application Priority Data

Mar. 15, 2010 (JP) ................................. 2010-058545

(51) Int. Cl.
*G02B 6/12* (2006.01)
(52) U.S. Cl.
USPC .......................................................... 385/14
(58) Field of Classification Search .................. None
See application file for complete search history.

(56) References Cited

U.S. PATENT DOCUMENTS

| | | | |
|---|---|---|---|
| 6,705,769 B2 * | 3/2004 | Brezina et al. | 385/88 |
| 6,879,032 B2 * | 4/2005 | Rosenau et al. | 257/696 |
| 7,751,660 B2 | 7/2010 | Ueno et al. | |
| 8,031,316 B2 * | 10/2011 | Fukai et al. | 349/150 |
| 2005/0012199 A1 * | 1/2005 | Rosenau et al. | 257/696 |
| 2006/0263013 A1 * | 11/2006 | Sone | 385/89 |
| 2009/0103857 A1 * | 4/2009 | Ohtsu et al. | 385/14 |

* cited by examiner

*Primary Examiner* — Sung Pak
(74) *Attorney, Agent, or Firm* — Osha Liang LLP

(57) ABSTRACT

This invention provides an optical transmission module that is of low cost and that can be mounted even in a narrow space. An optical transmission module of the present invention includes a light reception processing section for converting an optical signal transmitted by an optical wiring to an electric signal, a reception side substrate part including an electric wiring for transmitting the electric signal, and a reception side connector section for providing the electric signal to the light reception processing section and the reception side substrate part. The light reception processing section and the reception side connector section are mounted on a same substrate surface of the reception side substrate part, and the reception side substrate part includes a bending portion bent so that the substrate surfaces oppose each other at the back in the normal direction.

14 Claims, 17 Drawing Sheets

OPTICAL TRANSMISSION MODULE, ELECTRONIC DEVICE, AND METHOD FOR MANUFACTURING OPTICAL TRANSMISSION MODULE

BACKGROUND OF THE INVENTION

1. Technical Field

One or more embodiments of the present invention relate to an optical transmission module, an electronic device, and a method for manufacturing the optical transmission module.

2. Related Art

In recent years, higher speed in the data transmission speed between an LCD and an application processor is being demanded with higher definition of the LCD (Liquid Crystal Display) of a portable telephone. Furthermore, lower height and space saving of wiring and connecting section (connector) are demanded with advancement in the thinning of the portable telephone and the increase in the mounting functions. Review is being made on the optical wiring capable of realizing a large capacity data transmission with one optical wiring from such background, and an optical-electrical mixed module for carrying out data transmission using the optical signal and the electric signal between the circuit substrates is being developed.

FIG. 21 is a cross-sectional view schematically showing the configuration of a conventional optical transmission module. As shown in the figure, a light reception processing section 3 and a reception side connector section 36 are respectively mounted on both surfaces of a multi-layered FPC substrate portion formed with a plurality of wiring layers in the conventional optical transmission module.

In addition to the configuration shown in FIG. 21, Japanese Unexamined Patent Publication No. 2008-159766 (publicized on Jul. 10, 2008) describes a configuration in which a light circuit unit and an electrical circuit unit (terminals) are arranged on the same surface of a one-sided FPC formed with one layer of wiring layer, and the light circuit unit and the electrical circuit unit are electrically separated.

SUMMARY

The conventional optical transmission module, however, has the following issues.

In the optical transmission module described in Japanese Unexamined Patent Publication No. 2008-159766, the mounting part of the optical transmission module to the electronic device enlarges due to the drawing of the wiring and the ensuring of a sufficient isolation (electrical isolation) between the light circuit unit and the electrical circuit unit because the light circuit unit and the electrical circuit unit are formed on the same surface of the one-sided FPC.

In the conventional optical transmission module shown in FIG. 21, the mounting part of the optical transmission module can be miniaturized because the light reception processing section 3 and the reception side connector section 36 are respectively mounted on both surfaces of the substrate portion of the multi-layered FPC. However, crosstalk occurs because the electrical circuit unit (reception side connector section 36) and the light circuit unit (light reception processing section 3) are proximate to each other, and the high speed transmission characteristics are limited due to degradation of the waveform. Furthermore, the cost becomes high because the multi-layered FPC used to mount the light reception processing section 3 and the reception side connector section 36 is expensive.

One or more embodiments of the present invention has been devised to provide an optical transmission module that is of low cost and that can be mounted even in a narrow space, an electronic device, and a method for manufacturing the optical transmission module.

In accordance with an aspect of one or more embodiments of the present invention, there is provided an optical transmission module including: an optical module section including at least one of a reception module for converting an optical signal transmitted by an optical wiring to an electric signal or a transmission module section for converting the electric signal to the optical single and transmitting the optical signal through the optical wiring; a circuit substrate including an electric wiring for transmitting the electric signal; and a connecting section including an external connection terminal for providing the electric signal to the optical module section and the circuit substrate; the optical module section and the connecting section being mounted on a same substrate surface of the circuit substrate; wherein the circuit substrate includes a bending portion bent so that the substrate surfaces oppose each other at the back in a normal direction.

According to the above configuration, the circuit substrate is bent at the bending portion so that the substrate surfaces oppose each other at the back in the normal direction. The optical transmission module of one or more embodiments of the present invention is mounted on the electronic device with the circuit substrate bent at the bending portion.

Therefore, according to the above configuration, the enlargement of the mounting portion of the optical transmission module due to the drawing of the wiring can be avoided even if the one-sided FPC formed with one layer of wiring layer is used for the circuit substrate. Furthermore, the substrate formed with one layer of wiring layer can be used for the circuit substrate, and low cost can be realized.

Therefore, according to the above configuration, the optical transmission module of low cost that can be mounted even in a narrow space can be realized.

In the above aspect, the bending portion is arranged between the optical module section and the connecting section; and the optical module section and the connecting section are arranged in a normal direction of the circuit substrate due to the bend at the bending portion.

According to the above configuration, the space for the mounting portion of the optical transmission module can be saved because the module is arranged in the normal direction of the circuit substrate by the bend at the bending portion. Furthermore, double-sided mounting of the optical module section and the connecting section is substantially realized by the bend at the bending portion even if the one-sided FPC is used for the circuit substrate. Thus, according to the above configuration, low cost can be realized compared to when the optical module section and the connecting section are double-sided mounted in the multi-layer FPC formed with a plurality of wiring layer.

In the above aspect, a plate-shaped reinforcement section for reducing an electrical coupling between the optical module section and the connecting section is arranged in a gap portion formed by the back surfaces of the substrate surfaces. Therefore, the optical module section and the connecting section can be reinforced.

In the above aspect, the reinforcement section has a stacked structure stacked in the normal direction, the stacked structure including at least one metal layer.

According to the above configuration, the reinforcement section has a stacked structure stacked in the normal direction, where the stacked structure includes at least one metal layer, so that the influence of the radiation noise (EMI) generated from the connecting section on the optical module section can be reduced and the electromagnetic interference between the optical module section and the connecting section can be prevented.

In the above aspect, a first metal layer mostly arranged on the optical module section side of the metal layer is not grounded.

According to the above configuration, a large capacitance coupling can be avoided from generating between the optical element wiring, which connects the optical element and the IC in the optical module section, and the GND, and higher speed of the transmission signal can be realized.

In the above aspect, a second metal layer mostly arranged on the connecting section side of the metal layer is grounded. Thus, the shield effect with respect to the EMI from the connecting section can be enhanced.

In the above aspect, the reinforcement section is a three-layer structure in which a dielectric layer made of a dielectric body, and two metal layers made of metal for sandwiching the dielectric layer are stacked in the normal direction; and a first metal layer mostly arranged on the optical module section side is not grounded, and a second metal layer mostly arranged on the connecting section side is grounded.

According to the above configuration, the reinforcement section has a three layer structure in which a dielectric layer including a dielectric body, and two metal layers made of metal for sandwiching the dielectric layer are stacked in the normal direction, and hence the serial coupling of the electrostatic coupling between the optical element wiring and the first metal layer in the optical module section and the electrostatic coupling between the first metal layer and the second metal is formed. Therefore, parasitic capacitance generates even if the first metal layer mostly arranged on the optical module section side is not grounded.

According to the above configuration, because the second metal layer is grounded and the dielectric layer is arranged between the first and second metal layers, the parasitic capacitance caused by the serial coupling can be easily reduced by setting the dimension, material, and the like of the dielectric layer. In addition to such effect, the cross talk with the radiation noise from the connector section can be reduced and high speed transmission characteristics of the optical wiring module can be enhanced.

In the above aspect, the dielectric layer is configured by a dielectric material which relative permittivity is one to two.

In the above aspect, the optical module section includes, an optical element for receiving the optical signal transmitted through the optical wiring or emitting the optical signal to the optical wiring; a control unit for amplifying the optical signal received by the optical element or driving the light emission of the optical signal to the optical wiring; and an optical element wiring for connecting the optical element and the control unit; wherein a distance in the normal direction of the first and second metal layers is longer than a distance in the normal direction of the first metal layer and the optical element wiring.

In the above aspect, an overlapping portion of the first and second metal layers seen from the normal direction has a smaller area than the metal layer having a smaller area of the first and second metal layers.

The parasitic capacitance caused by the serial coupling of the electrostatic capacities can be easily reduced by setting the material of the dielectric layer, the distance in the normal direction of the first and second metal layers, and the area of the overlapping portion of the first and second metal layers.

In the above aspect, the circuit substrate includes a grounded shield layer on a surface; and the second metal layer is conducted with the shield layer.

According to the above configuration, the grounding of the second metal layer is realized with the configuration of conducting the shield layer grounded on the surface of the circuit substrate and the second metal layer, Thus, application is suitably made when the one-sided FPC is used for the circuit substrate.

In the above aspect, the connecting section is arranged on a side opposite to the electric wiring in the optical module section at the same substrate surface of the circuit substrate.

Thus, the optical transmission module can be assembled by bending the circuit substrate at the bending portion after mounting the optical wiring on the optical module section, and hence the optical transmission module can be easily manufactured.

In the above aspect, the optical module section is arranged on a side opposite to the electric wiring in the connecting section at the same substrate surface of the circuit substrate.

Therefore, a configuration in which the optical module section is not interposed between the connecting section and the electric wiring is adopted. According to such configuration, the electric wiring for connection with the connecting section does not need to be drawn avoiding the optical module section, and the mounting portion of the optical module section and the connecting section in the circuit substrate can be miniaturized.

In the above aspect, the bending portion is arranged on a side opposite to the optical module section in the connecting section at the same substrate surface of the circuit substrate.

According to such configuration, the connecting section and the optical module section are not arrayed in the normal direction but are arrayed in a direction along the substrate surface when bent at the bending portion. Thus, according to such configuration, the height of the optical transmission module in the normal direction can be reduced, and lower height of the entire module can be realized.

In accordance with another aspect of one or more embodiments of the present invention, there is provided an electronic device including the above optical transmission module.

According to the above configuration, an electronic device that is of low cost and that enables the mounting of the optical transmission module even to a narrow space can be realized.

In accordance with still another aspect of one or more embodiments of the present invention, there is provided a method for manufacturing an optical transmission module including, an optical module section including at least one of a reception module for converting an optical signal transmitted by an optical wiring to an electric signal or a transmission module section for converting the electric signal to the optical single and transmitting the optical signal through the optical wiring;

a circuit substrate including an electric wiring for transmitting the electric signal; and a connecting section including an external connection terminal for providing the electric signal to the optical module section and the circuit substrate; the optical module section and the connecting section being mounted on a same substrate surface of the circuit substrate; the method including the step of:

assembling the optical transmission module by combining a mounting stage of mounting the optical wiring on the optical module section and a bending stage of bending the circuit substrate so that the substrate surface oppose each other at the back in a normal direction of the circuit substrate.

According to such configuration, the optical module is assembled in the assembly step by combining the mounting stage of mounting the optical wiring on the optical module section and the bending stage of bending the circuit substrate so that the substrate surfaces oppose each other at the back in the normal direction of the circuit substrate, and hence the method for manufacturing the optical transmission module that is of low cost and that can be mounted even to a narrow space can be realized.

In the above still another aspect, the mounting stage is performed with the circuit substrate bent after the bending stage in the assembly step. This manufacturing method is particularly suitable for the method of manufacturing the optical transmission module in which the bending portion is arranged between the optical module section and the connecting section, and the optical module section is arranged on the side opposite to the electric wiring in the connecting section at the same substrate surface of the circuit substrate.

In the above another aspect, the bending stage is performed with the optical wiring mounted on the optical module section after the mounting stage in the assembly step. This manufacturing method is particularly suitable for the method of manufacturing the optical transmission module in which the bending portion is arranged between the optical module section and the connecting section, and the connecting section is arranged on the side opposite to the electric wiring in the optical module section at the same substrate surface of the circuit substrate.

As described above, the optical transmission module of one or more embodiments of the present invention has a configuration in which the circuit substrate has a bending portion bent so that the substrate surfaces oppose each other at the back in the normal direction, The electronic device of one or more embodiments of the present invention is configured to include the optical transmission module.

The method for manufacturing the optical transmission module of one or more embodiments of the present invention the optical module includes the assembly step of assembling the optical transmission module by combining the mounting stage of mounting the optical wiring on the optical module section and the bending stage of bending the circuit substrate so that the substrate surfaces oppose each other at the back in the normal direction of the circuit substrate.

The optical transmission module that is of low cost and that can be mounted even to a narrow space thus can be realized.

BRIEF DESCRIPTION OF THE DRAWINGS

FIG. 1A is a top view, FIG. 1B is a bottom view, and FIG. 1C is a cross-sectional view schematically showing the configuration in the vicinity of a light reception processing section when bent at a bending portion;

FIG. 10A is a top view showing a configuration example in which the area of the overlapping portion of the two reinforcement plates is smaller than the reinforcement plate with smaller area of the areas of the two reinforcement plates, and FIG. 10B is a top view showing a configuration example in which the area of the reinforcement plate on the light reception processing section side is smaller than the area of the reinforcement plate on the reception side connector section side;

FIG. 17A is a top view and FIG. 17B is a cross-sectional view showing a state bent at the bending portion;

FIG. 18A is a top view, FIG. 18B is a side view showing a configuration example connected to the FPC connector in a state bent at the bending portion, and FIG. 18C is a side view showing a configuration example ACF-connected in a state bent at the bending portion;

DETAILED DESCRIPTION

Hereinafter, one embodiment of the present invention will be described based on FIGS. 1A to 1C.

In the present embodiment, a configuration of performing information (data) transmission between a main body and a lid through an optical transmission module arranged in a hinge in a foldable portable telephone including the main body with operation keys, the lid with a display screen, and the hinge for rotatably connecting the lid to the main body will be described by way of example.

Figure 2A:
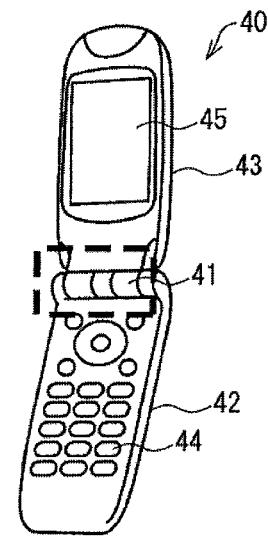
FIG. 2A is a perspective view showing an outer appearance of a foldable portable telephone incorporating an optical transmission module of the present embodiment.
Figure 2B:
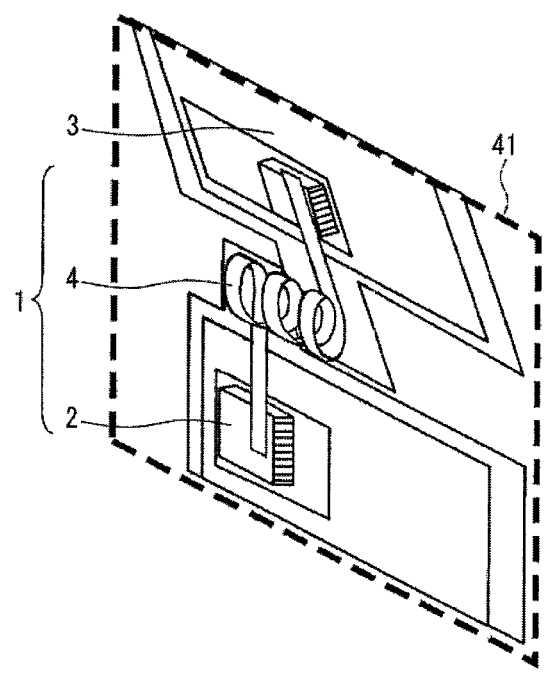
FIG. 2B is a perspective plan view of a hinge (portion surrounded with a broken line) in FIG. 2A.

FIG. 2A is a perspective view showing an outer appearance of a foldable portable telephone 40 incorporating an optical transmission module 1 of the present embodiment, and FIG. 2B is a perspective plan view of a hinge 41 (portion surrounded with a broken line) in FIG. 2A.

As shown in FIGS. 1A to 1C and FIGS. 2A, 2B, the foldable portable telephone 40 (hereinafter simply referred to as portable telephone 40) according to the present embodiment is configured by a main body 42, a hinge 41 arranged at one end of the main body 42, and a lid 43 rotatably arranged with the hinge 41 as a shaft.

The main body 42 includes operation keys 44 for operating the portable telephone 40, and interiorly includes a main control substrate 20. The lid 43 includes a display screen 45 and a camera (not shown) on the outside and interiorly includes an application circuit substrate 30. A driver 39, and the like are mounted.

In the portable telephone 40 having such configuration, the information (data) transmission between the main control substrate 20 and the application circuit substrate is carried out through the optical transmission module 1.

Configuration of Optical Transmission Module

Figure 3A:
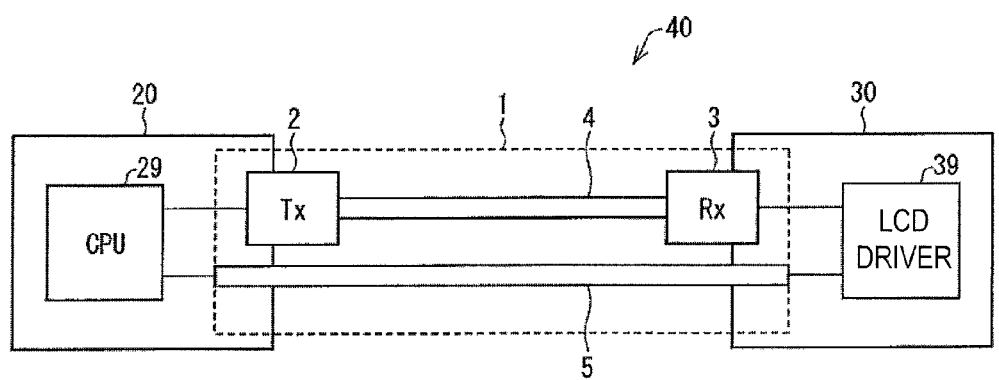
FIG. 3A is a block diagram showing the applied portion of the optical transmission module in the portable telephone according to the present embodiment.

The configuration of the optical transmission module 1 will be described below with reference to FIGS. 3A and 3B. FIG. 3A is a block diagram showing the applied portion of the optical transmission module 1 in the portable telephone 40 according to the present embodiment, and FIG. 3B is a block diagram showing a schematic configuration of the optical transmission module 1 in the portable telephone 40 according to the present embodiment.

Figure 3B:
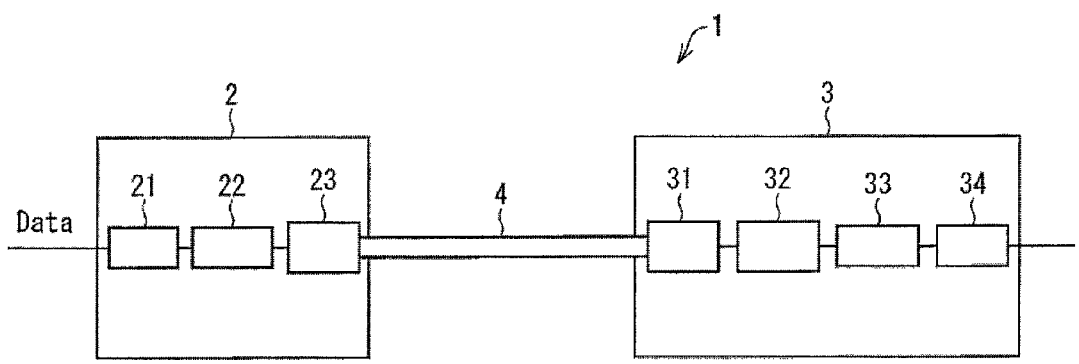
FIG. 3B is a block diagram showing a schematic configuration of the optical transmission module in the portable telephone according to the present embodiment.

As shown in FIGS. 3A and 3B, the optical transmission module 1 is configured to include a light transmission processing section (transmission module section, optical module section) 2 connected to the main control substrate 20 for mounting a CPU 29, a light reception processing section (reception module section, optical module section) 3 connected to the application circuit substrate 30 for mounting an application circuit such as the LCD driver 39, and an optical wiring 4 and an electric wiring 5 for connecting the light transmission processing section 2 and the light reception processing section 3.

The optical wiring 4 is a medium for transmitting optical signals serving as data signals emitted from a light emitting unit 23 to a light receiving unit 31. The details of the optical wiring 4 will be described later. The electric wiring 5 transmits low speed signals and power supply between the main control substrate 20 and the application circuit substrate 30.

As shown in FIG. 3B, the light transmission processing section 2 is configured to include an interface circuit (hereinafter written as I/F circuit) 21, a light emission drive unit (optical converter) 22, and a light emitting unit 23.

The I/F circuit 21 is a circuit for receiving a high speed data signal from the outside. The I/F circuit 21 is arranged between the electric wiring of the electric signal input to the optical transmission module 1 from the outside and the light emission drive unit 22.

The light emission drive unit 22 drives the light emission of the light emitting unit 23 based on the electric signal input to the optical transmission module 1 from the outside through the I/F circuit 21. The light emission drive unit 22 can be configured by an IC (Integrated Circuit) for light emission drive. The I/F circuit 21 and the light emission drive unit 22 may be configured by an IC.

The light emitting unit 23 emits light based on the drive control by the light emission drive unit 22. The light emitting unit 23 can be configured by a light emitting element such as a VCSEL (Vertical Cavity-Surface Emitting Laser). The light emitted from the light emitting unit 23 enters a light incident side end of the optical wiring 4 as an optical signal.

The light transmission processing section 2 thus converts the electric signal input to the light transmission processing section 2 to an optical signal corresponding to the electric signal, and outputs the optical signal to the optical wiring 4.

The light reception processing section 3 is configured to include the light receiving unit 31, a detection circuit 32, an amplification unit (amplifier) 33, and an I/F circuit 34.

The light receiving unit 31 receives the light serving as the optical signal exit the light exit side end of the optical wiring 4, and outputs an electric signal through photoelectric conversion. The light receiving unit 31 can be configured by a light receiving element such as a PD (Photo-Diode). The detection circuit 32 determines whether or not the light receiving unit 31 received the optical signal.

The amplification unit 33 amplifies the electric signal output from the light receiving unit 31 and the detection circuit 32 to a desired value, and outputs the same to the outside. The amplification unit 33 can be configured by an IC for amplification.

The I/F circuit 34 is a circuit for outputting the electric signal amplified by the amplification unit 33 to the outside of the optical transmission module 1. The I/F circuit 34 is connected to the electric wiring for transmitting the electric signal to the outside, and is arranged between the amplification unit 32 and the electric wiring. The detection circuit, the amplification circuit, and the I/F circuit may be configured by an IC.

Therefore, the light reception processing section 3 receives the optical signal output from the light transmission processing section 2 through the optical wiring 4, converts the optical signal to the electric signal corresponding to the optical signal, and then amplifies to a desired signal value and outputs the same to the outside.

Configuration of Optical Wiring

Figure 4A:
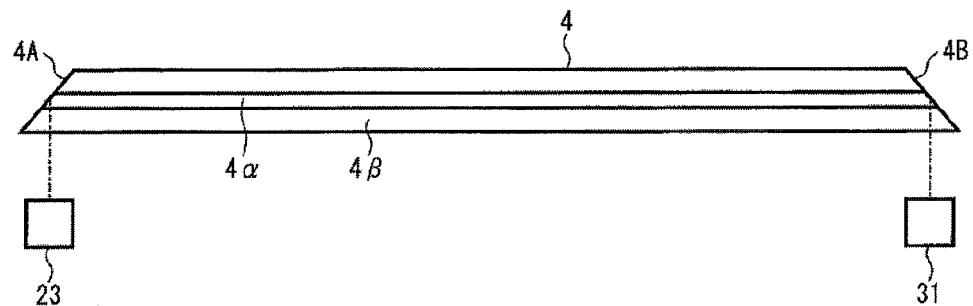
FIG. 4A is a side view of the optical wiring.
Figure 4B:
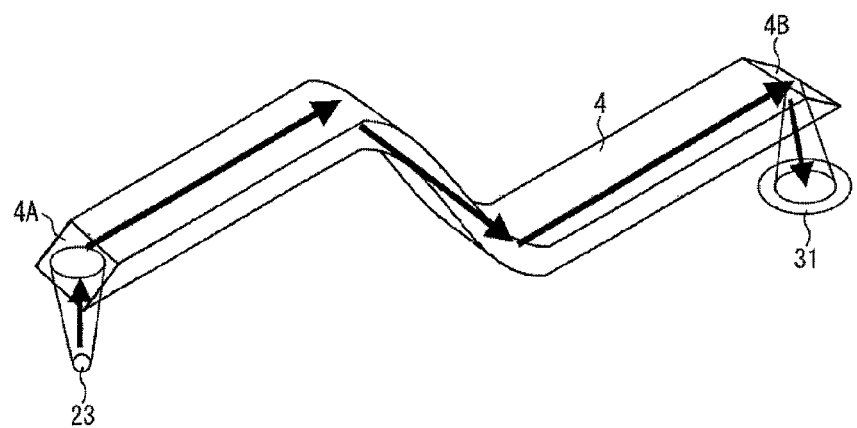
FIG. 4B is a perspective view schematically showing the state of light transmission in the optical wiring.

The details of the optical wiring 4 will now be described using FIG. 4A and FIG. 4B. FIG. 4A shows a side view of the optical wiring 4. As shown in the figure, the optical wiring 4 is configured to include a column-shaped core 4α having the light transmitting direction as an axis, and a clad 4β arranged to surround the periphery of the core 4α. The core 4α and the clad 4β are made from a material having translucency, where the index of refraction of the core 4α is higher than the index of refraction of the clad 4β. The optical signal that entered the core 4α is transmitted in the light transmitting direction by repeating total reflection inside the core 4α.

The material for forming the core 4α and the clad 4β may be glass, plastic, or the like, but resin material of acryl, epoxy, urethane, and silicon is preferably used to configure the optical wiring 4 having sufficient flexibility. The clad 4β may be made from gas such as air. Similar effects can be obtained even if the clad 4β is used under a liquid atmosphere having a smaller index of refraction than the core 4α.

The mechanism of light transmission by the optical wiring 4 will now be described using FIG. 4B. FIG. 4B schematically shows the state of light transmission in the optical wiring 4. As shown in the figure, the optical wiring 4 is configured by a member having flexibility. A light incident surface 4A is provided at the light incident end of the optical wiring 4, and a light exit surface 4B is provided at the light exit end.

The light emitted from the light emitting unit 23 enters the light incident end of the optical wiring 4 from a direction perpendicular to or substantially perpendicular to the light transmitting direction of the optical wiring 4. The incident light is introduced into the optical wiring 4 by being reflected at the light incident surface 4A, and advances through the core 4α. The light that advanced through the optical wiring 4 and reached the light exit end is reflected at the light exit surface 4B so as to exit in a direction perpendicular to or substantially perpendicular to the light transmitting direction of the optical wiring 4. The light receiving unit 31 is irradiated with the exit light, and photoelectric conversion is carried out in the light receiving unit 31.

According to such configuration, the light emitting unit 23 serving as a light source can be arranged in a direction perpendicular to or substantially perpendicular to the light transmitting direction in the optical wiring 4. Thus, when the optical wiring 4 needs to be arranged parallel to the substrate surface, the light emitting unit 23 may be installed between the optical wiring 4 and the substrate surface so as to emit the light in the normal direction of the substrate surface. Such configuration is easier to mount than the configuration in which the light emitting unit 23 is installed so as to emit the light parallel to the substrate surface, and can be more miniaturized in terms of configuration. This is because the size in the direction perpendicular to the direction of emitting light is greater than the size in the direction of emitting light in the general configuration of the light emitting unit 23. Furthermore, application can be made even to the configuration that uses a light emitting element for plane mounting in which an electrode and the light emitting unit 23 are in the same plane.

The optical wiring 4 shown in the figure has a configuration in which the light incident surface 4A and the light exit surface 4B are inclined, but the optical wiring 4 according to the present embodiment may have a configuration in which both end faces are orthogonal to the light transmitting direction. In other words, the outer shape of the optical wiring 4 may be formed to a solid rectangular shape. The optical wiring 4 may be an optical fiber such as a POF.

Configuration of Electric Wiring

The details on the electric wiring 5 will now be described. As shown in FIG. 3A, the electric wiring 5 is arranged parallel to the optical wiring 4 to connect the CPU 29 and the LCD driver 39 and transmit low speed data signals and power supply signals output from the CPU 29 to the LCD driver 39.

Figure 5:
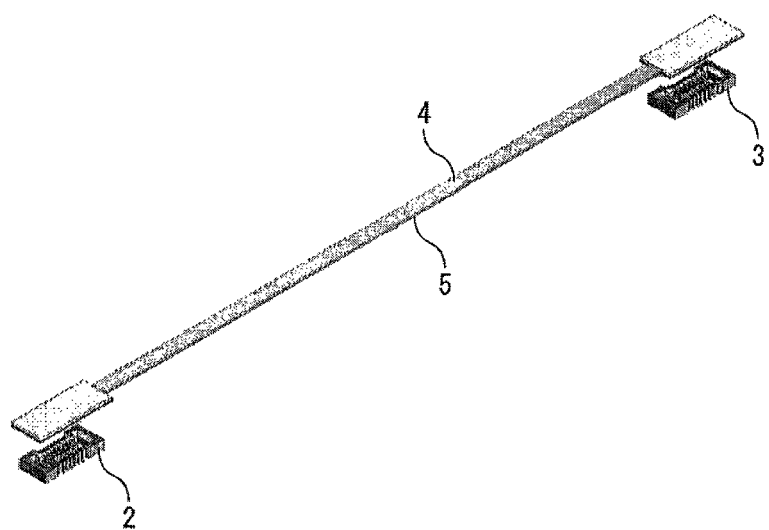
FIG. 5 is a perspective view showing a schematic configuration of the optical transmission module when the electric wiring is configured by the FPC.

Specifically, the electric wiring 5 is configured by a flexible print circuit (FPC) board, a coaxial cable, and the like. FIG. 5 is a perspective view showing a schematic configuration of the optical transmission module 1 when the electric wiring 5 is configured by the FPC. The optical transmission module 1 can be applied to small electronic devices such as a portable device by configuring the optical wiring 4 and the electric wiring 5 with flexible wiring.

Characteristic Configuration of Optical Transmission Module

The characteristic configuration of the optical transmission module 1 will now be described with reference to FIGS. 1A to 1C. FIGS. 1A to 1C show a schematic configuration of the optical transmission module 1 of the present embodiment, where FIG. 1A is a top view and FIG. 1B is a bottom view. FIGS. 1A and 1B are developed views of before being bent at the bending portion, to be described later.

Figure 1A:
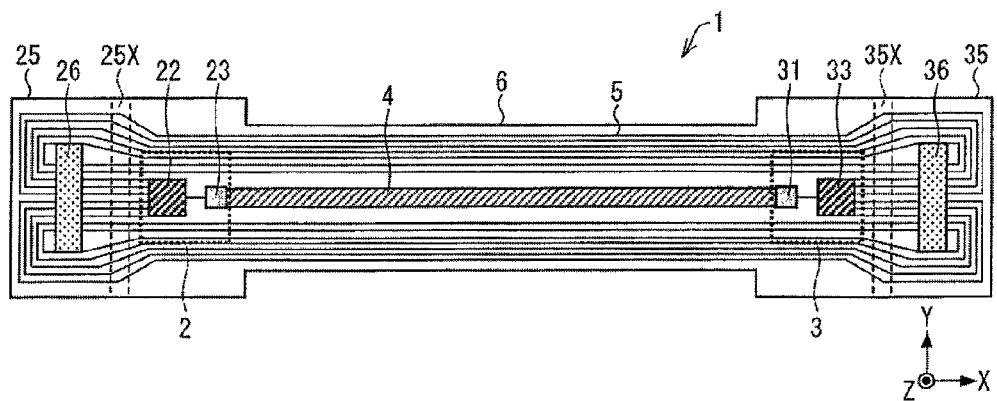
FIGS. 1A to 1C show a schematic configuration of an optical transmission module of the present embodiment, where
Figure 1B:
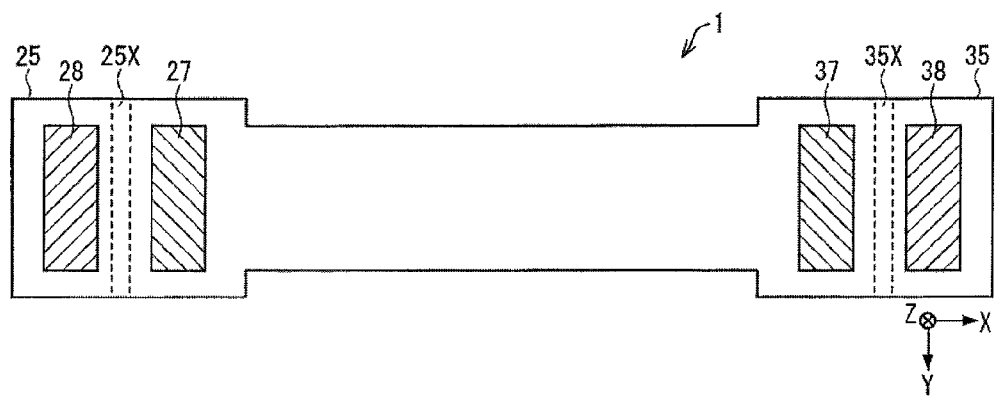

As shown in FIGS. 1A and 1B, the optical transmission module 1 includes a circuit substrate with the electric wiring 5. The circuit substrate includes a transmission side substrate part 25 mounted with the light transmission processing section 2 and a transmission side connector section (connecting section) 26, a reception side substrate part 35 mounted with the light reception processing section 3 and a reception side connector section (connecting section) 36, and an electric wiring part 6 interposed between the transmission side substrate part 25 and the reception side substrate part 35. The electric wiring part 6 includes the electric wiring 5 for performing electric transmission between the transmission side connector section 26 and the reception side connector section 36.

The transmission side connector section 26 and the reception side connector section 36 are respectively arranged to perform input or output, or both input and output of signals transmitted in the optical wiring 4 and the electric wiring 5 as electric signals (in the case of two-way transmission). The transmission side connector section 26 and the reception side connector section 36 each has an external connection terminal. The external connection terminal provides electric signals to the light transmission processing section 2 and the transmission side substrate part 25 or to the light reception processing section 3 and the reception side substrate part 35. A board-to-board type connector is a specific example of the transmission side connector section 26 and the reception side connector section 36.

The light transmission processing section 2 and the transmission side connector section 26 are mounted on the same surface of the transmission side substrate part 25. Reinforcement plates 27 and 28 are arranged on the surface on the opposite side of the light transmission processing section 2 and the transmission side connector section 26 in the transmission side substrate part 25. The reinforcement plates 27 and 28 are arranged to correspond to the light transmission processing section 2 and the transmission side connector section 26, respectively. Similar to the light transmission processing section 2 and the transmission side connector section 26, the light reception processing section 3 and the reception side connector section 36 are mounted on the same surface of the reception side substrate part 35. Reinforcement plates 37 and 38 are arranged on the surface on the opposite side of the light reception processing section 3 and the reception side connector section 36. The reinforcement plates 37 and 38 are arranged to correspond to the light reception processing section 3 and the reception side connector section 36, respectively. In the following, the transmitting direction of the optical signals in the optical wiring 4 is the X-direction, the normal direction of the transmission side substrate part 25 and the reception side substrate part 35 is the Z-direction, and the direction perpendicular to the X-direction and the Z-direction is the Y-direction in FIG. 1A. The Z-direction is the height direction of the optical transmission module 1.

The optical transmission module 1 of the present embodiment has characteristics in that bending portions 25X, 35X are respectively arranged in the transmission side substrate part 25 and the reception side substrate part 35. The bending portions 25X, 35X allow the transmission side substrate part 25 and the reception side substrate part 35 to be bent such that the substrate surfaces oppose each other at the back in the Z-direction or the normal direction. The optical transmission module 1 is mounted on the electronic device such as the portable telephone 40 with the transmission side substrate part 25 and the reception side substrate part 35 bent at the bending portions 25X, 35X.

As shown in FIGS. 1A and 1B, the bending portions 25X and 35X are respectively arranged between the light transmission processing section 2 and the transmission side connector section 26, and between the light reception processing section 3 and the reception side connector section 36. Thus, the reception side substrate part 35 has a configuration shown in FIG. 1C when bent at the bending portion 35X. FIG. 1C is a cross-sectional view schematically showing the configuration in the vicinity of the light reception processing section 3 when bent at the bending portion 35X. The positional relationship of the light transmission processing section 2 and the transmission side connector section 26 of when bent at the bending portion 25X is similar to the positional relationship of the light reception processing section 3 and the reception side connector section 36 shown in FIG. 1C, and thus the description will be omitted. The configuration in the vicinity of the light reception processing section 3 when bent at the bending portion 35X will be described below.

Figure 1C:
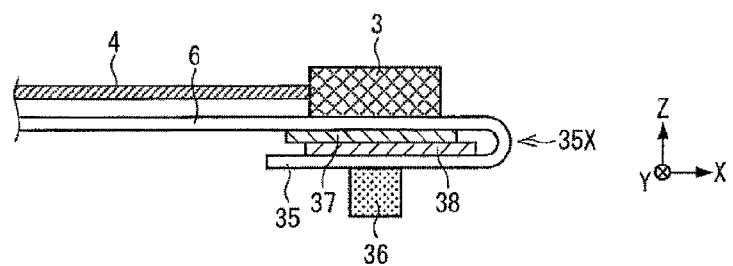

As shown in FIG. 1C, the light reception processing section 3 and the reception side connector section 36 are arrayed in the X-direction when bent at the bending portion 35X.

According to the configuration shown in FIG. 1C, the mounting portion (mounting portion to the application circuit substrate 30) of the optical transmission module 1 due to drawing of wiring can be avoided from becoming large even if a one-sided FPC formed with one layer of wiring layer is used for the reception side substrate part 35. Thus, according to the configuration shown in FIG. 1C, the space for the mounting portion of the optical transmission module 1 can be saved. Furthermore, lower cost can be realized compared to when the multi-layered FPC formed with a plurality of wiring layers is used because the one-sided FPC is used for the reception side substrate part 35.

Regarding Reinforcement Section

In the optical transmission module 1, the reinforcement plates 37 and 38 are bent at the bending portion 35X thereby forming a reinforcement section. The reinforcement section is formed in a gap portion formed by the back surface of the reception side substrate part 35. The reception side substrate part 36 is a flexible substrate such as FPC, and thus the reinforcement section has a role of reinforcing the light transmission processing section 3 and the reception side connector section 36. Furthermore, the reinforcement section also has a role of reducing the electrical coupling and electrically separating the light reception processing section 3 and the reception side connector section 36. Due to the role of electrical separation, the reinforcement section can also be considered an electrical separating section, inserted between the light reception processing section 3 and the reception side connector section 36, for reducing the electrical coupling. The electrical separating section can be defined as a plate-shaped piece having a function of reducing the electrical coupling inserted between the light reception processing section 3 and the reception side connector section 36.

In a structure where the wiring of the light reception processing section 3 and the wiring of the reception side connector section 36 are arrayed in the Z-direction as in the optical transmission module 1, the noise flows into the wiring of the light reception processing section 3 due to electromagnetic coupling and electrostatic coupling of both wirings. Such flow of noise becomes waveform degradation such as the jitter, and limits the transmission speed. A layer for reducing the electromagnetic coupling and the electrostatic coupling is inserted between the light reception processing section 3 and the reception side connector section 36 to avoid such flow of noise. The electrical separation by the reinforcement section may be method A of separating the reception side substrate parts 35 in the Z-direction in the bent state and isolating by increasing the distance, or a method B of inserting a shield between the reception side substrate parts 35 in the Z-direction. When the method A is adopted, the material for configuring the reinforcement section is not limited to metal and may be configured with only a dielectric body.

The reinforcement section has a stacked structure in which a plurality of layers is stacked in the Z-direction. In the configuration shown in FIG. 1C, the reinforcement section is formed by two reinforcement plates 37 and 38, but the configuration of the reinforcement section is not particularly limited as long as it is a stacked structure stacked in the Z-direction and includes at least one reinforcement plate.

The stacked structure of the reinforcement section preferably includes at least one metal layer (conductor layer). According to such configuration, an electromagnetic shield can be formed with respect to the unnecessary radiation (EMI: Electromagnetic Interference) from the reception connector section 36 by the metal layer. The metal layer in the stacked structure may be configured by the reinforcement plates 37 or 38, or may be a silver (Ag) shield formed in the reception side substrate part 35, to be described later.

The reinforcement plates 37 or 38 may be configured by a metal such as a stainless steel (SUS), or may be configured by a dielectric body such as polyimide (PI). If configured by a metal, the reinforcement plates 37 or 38 has two roles of a reinforcing the light reception processing section 3 and the reception side connector section 36, and an electromagnetic shield. If configured by a dielectric body, the reinforcement plate 37 or 38 may have a metal thin film formed on the surface.

Thus, the stacked structure of the reinforcement section preferably has a configuration in which the dielectric layer including the dielectric body is stacked on the metal layer when including at least one metal layer. The dielectric layer may be a reinforcement plate configured by a dielectric body, or may be an adhesive configured by an epoxy resin, and the like.

The configuration of the reinforcement section that can be applied to the optical transmission module 1 will be described below with reference to FIGS. 6A to 6H. FIGS. 6A to 6H are respectively a cross-sectional view showing a configuration example of the reinforcement section that can be applied to the optical transmission module 1. In FIGS. 6A to 6H, the reception side substrate part 35 on the upper side in the Z-direction shows the portion where the light reception processing section 3 is mounted, and the reception side substrate part 35 on the lower side in the Z-direction shows the portion where the reception side connector section 36 is mounted.

The stacked structure shown in FIGS. 6A to 6D has a three-layer structure including a dielectric layer 39, and two metal layers sandwiching the dielectric layer 39. The two metal layers sandwiching the dielectric layer 39 are configured by a reinforcement plate made of metal, a silver (Ag) shield formed on the reception side substrate part 35, and the like.

Figure 6A:
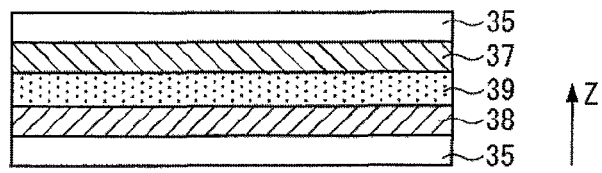
FIGS. 6A to 6H are respectively a cross-sectional view showing a configuration example of the reinforcement section that can be applied to the optical transmission module.

First, the stacked structure shown in FIG. 6A is an example where two reinforcement plates 37 and 38 are arranged and such reinforcement plates 37 and 38 are made of metal. In the configuration example shown in FIG. 6A, the dielectric layer 39 is arranged between the two reinforcement plates 37 and 38. The dielectric layer 39 may be configured as a reinforcement plate made of polyimide (PI), and the like, or may be configured with an adhesive such as an epoxy resin.

Figure 6B:
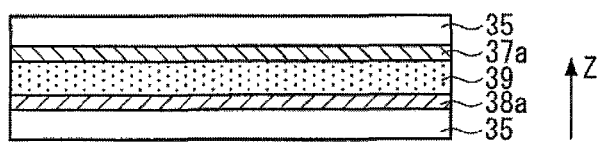

The stacked structure shown in FIG. 6B is an example where one reinforcement plate (reinforcement plate 37 or 38) is arranged and such reinforcement plate configures the dielectric layer 39 including the dielectric body. In the configuration example shown in FIG. 6B, metal layers 37a and 38a are arranged to sandwich the dielectric layer 39. The metal layers 37a and 38a may be a metal thin film formed on the reinforcement plate 37 or 38, or may be a silver (Ag) shield formed on the reception side substrate part 35.

Figure 6C:
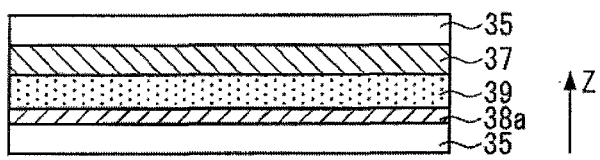

The stacked structure shown in FIG. 6C is an example where the reinforcement plate 37 is configured from a metal. In the configuration shown in FIG. 6C, the dielectric layer 39 is arranged on the surface on the side opposite to the light reception processing section 3 in the reinforcement plate 37. The metal layer 38a is arranged on the surface on the side opposite to the reinforcement plate 37 in the dielectric layer 39.

Figure 6D:
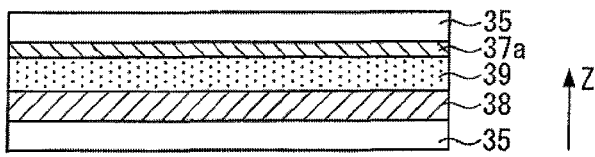

The stacked structure shown in FIG. 6D is an example where the reinforcement plate 38 is configured from a metal. In the configuration shown in FIG. 6D, the dielectric layer 39 is arranged on the surface on the side opposite to the reception side connector section 36 in the reinforcement plate 38. The metal layer 37a is arranged on the surface on the side opposite to the reinforcement plate 38 in the dielectric layer 39.

The dielectric layer 39 shown in FIGS. 6C and 6D may be configured as a reinforcement plate made of polyimide (PI), and the like, or may be configured with an adhesive such as an epoxy resin. The metal layers 37a and 38a shown in FIGS. 6C and 6D may be a metal thin film formed on the reinforcement plate 37 or 38 (when the dielectric layer 39 is configured as the reinforcement plate 37 or 38), or may be a silver (Ag) shield formed on the reception side substrate part 35.

The stacked structures shown in FIGS. 6E to 6H have a two-layer structure in which the metal layer is stacked on the dielectric layer 39.

Figure 6E:
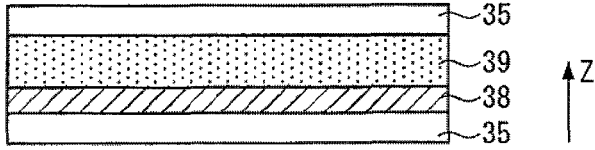
Figure 6F:
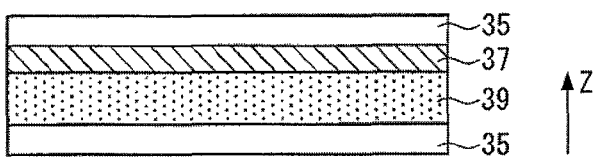

First, the stacked structure shown in FIG. 6E is an example of including the reinforcement plate 38 made of metal. In the configuration example shown in FIG. 6E, the dielectric layer 39 is arranged on the surface on the side opposite to the reception side connector section 36 in the reinforcement plate 38. The stacked structure shown in FIG. 6F is an example of including the reinforcement plate 37 made of metal. In the configuration example shown in FIG. 6F, the dielectric layer 39 is arranged on the surface on the side opposite to the reception processing section 3 in the reinforcement plate 37. The dielectric layer 39 shown in FIGS. 6E and 6F may be configured as a reinforcement plate made of polyimide (PI), and the like, or may be configured with an adhesive such as an epoxy resin.

Figure 6G:
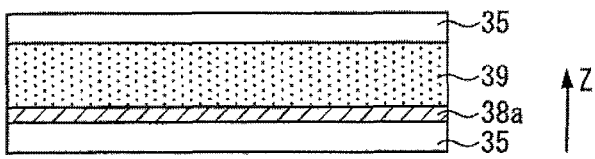
Figure 6H:
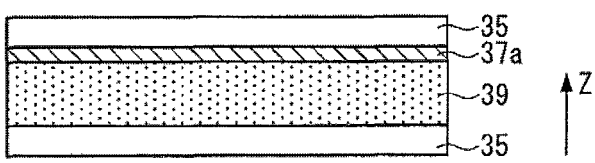

The stacked structure shown in FIG. 6G is an example of a two-layer structure including a dielectric layer 29 and a metal layer 38a. The stacked structure shown in FIG. 6H is an example of a two-layer structure including the dielectric layer 29 and a metal layer 37a.

When the reception connector section 36 of the optical transmission module 1 is mounted on the application circuit substrate 30 etc. of the portable telephone 40, unnecessary radiation (EMI) occurs from mismatching of impedance, and the like. The degradation in transmission characteristics such as increase in jitter occurs (cross talk) when the EMI interferes with the circuit in the light reception processing section 3. The transmission speed between the substrates is thus limited. With the stacked structure in which the reinforcement section includes at least one metal layer, as shown in FIGS. 6A to 6H, the influence of the EMI generated from the reception side connector section 36 on the light reception processing section 3 can be reduced. Thus, the optical transmission module 1 enabling high speed transmission can be realized according to the configurations shown in FIGS. 6A to 6H.

Figure 7:
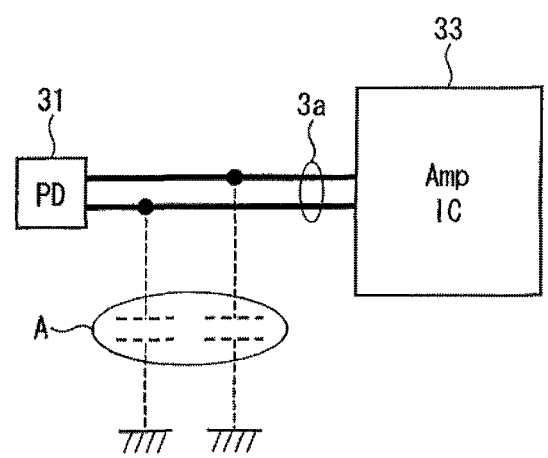
FIG. 7 is a schematic view describing the parasitic capacitance generated between the optical element wiring in the optical module section and the proximate GND (grounded metal layer)

As shown in FIG. 7, the light reception processing section 3 is mounted with the light receiving unit 31 and the amplification unit 33, and includes an optical element wiring 3a for connecting the light receiving unit 31 and the amplification unit 33. High frequency current is transmitted in the optical element wiring 3a. When parasitic capacitance A generates between the optical element wiring 3a and the proximate GND (grounded metal layer), waveform degradation (increase of jitter) occurs due to loss of the high frequency component of the signal thereby limiting the transmission speed. When the stacked structure in which the reinforcement section includes at least one metal layer is arranged, the metal layer arranged on the light reception processing section 3 side the most is preferably not grounded and is electrically opened. With such configuration, a large capacitance coupling can be avoided from generating between the optical element wiring 3a and the GND, and higher speed of the transmission signal can be realized.

The metal layer (metal layer 38a or reinforcement plate 38 made of metal) arranged on the reception side connector section 36 the most is preferably grounded. The shield effect with respect to the EMI from the reception side connector section 36 is thereby enhanced.

The electrical mode of the metal layer in the stacked structure of the reinforcement section will be further described in detail with reference to FIGS. 8A to 8E. FIGS. 8A to 8E are respectively a cross-sectional view showing a specific example of the electrical mode of the metal layer in the stacked structure of the reinforcement section. In FIGS. 8A to 8E, the reception side substrate part 35 on the upper side in the Z-direction shows the portion where the light reception processing section 3 is mounted, and the reception side substrate part 35 on the lower side in the Z-direction shows the portion where the reception side connector section 36 is mounted.

Figure 8A:
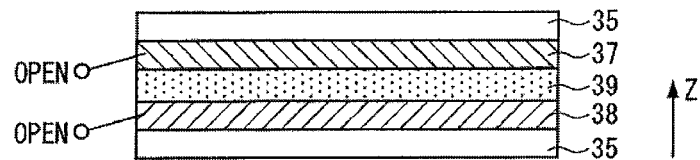
FIGS. 8A to 8E are respectively a cross-sectional view showing a specific example of the electrical mode of the metal layer in the stacked structure of the reinforcement section.
Figure 8B:
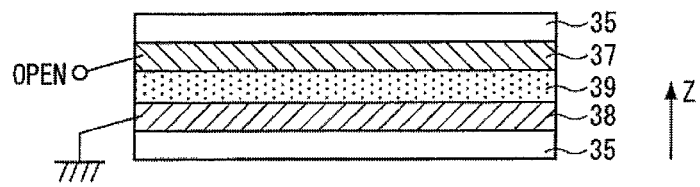
Figure 8C:
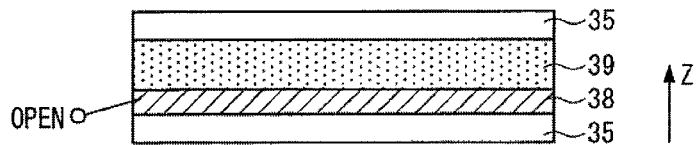
Figure 8D:
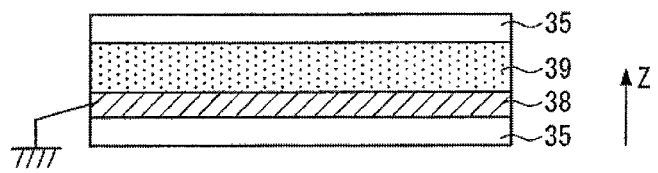
Figure 8E:
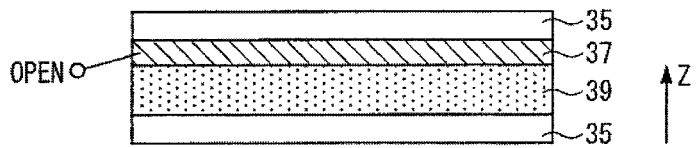

FIGS. 8A and 8B show specific examples of when the reinforcement section is a three-layer structure, and FIGS. 8C to 8E show specific examples of when the reinforcement section is a two-layer structure.

The three-layer structure shown in FIG. 8A is configured by the dielectric layer 39 and the reinforcement plates 37 and 38 for sandwiching the dielectric layer 39. The reinforcement plates 37 and 38 are configured by metal and are both not grounded. The three-layer structure shown in FIG. 8B is a structure similar to FIG. 8A, where the reinforcement plate 37 is not grounded but the reinforcement plate 28 is grounded.

The two-layer structure shown in FIG. 8C is configured by the dielectric layer 39 and the reinforcement plate 38. The reinforcement plate 38 is configured by metal and is not grounded. The two-layer structure shown in FIG. 8D is a structure similar to FIG. 8C, but the reinforcement plate 38 is grounded.

The two-layer structure shown in FIG. 8E is configured by the dielectric layer 39 and the reinforcement plate 37. The reinforcement plate 37 is configured by metal, and is not grounded.

The stacked structures shown in FIGS. 8A, 8C, and 8E of FIGS. 8A to 8E have configurations in which the grounded reinforcement plate is not arranged. Even with such configuration, the EMI from the reception side connector section 36 can be reflected at the boundary of the reinforcement plate made of metal, and hence the interference with the optical element wiring 3a can be prevented.

The stacked structures including the reinforcement plates 37, 38 made of metal are shown in FIGS. 8A to 8E, but the electrical mode of the metal layer in the stacked structure of the reinforcement section may be applied to the stacked structure including the metal layers 37a and 38a shown in FIGS. 6A to 6H instead of the reinforcement plates 37 and 38 made of metal. The dielectric layer 39 may be configured as a reinforcement plate made of polyimide (PI), and the like, or may be configured with an adhesive such as an epoxy resin.

Figure 9:
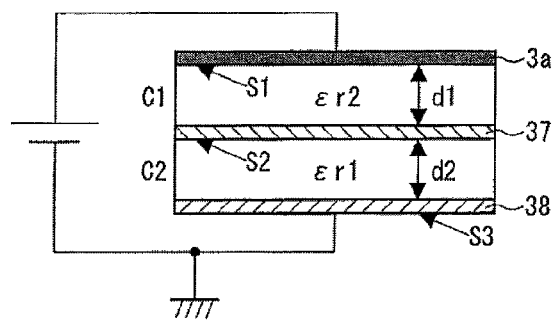
FIG. 9 shows a circuit diagram of when the stacked structure shown in FIG. 8B is applied.

The stacked structure shown in FIG. 8B of the stacked structures shown in FIGS. 8A to 8E is suitably used in the optical transmission module 1. In other words, the reinforcement section in the optical transmission module 1 is preferably a three-layer structure in which the dielectric layer 39 including the dielectric body, and two reinforcement plates 37 and 38 made of metal for sandwiching the dielectric layer 39 are stacked in the normal direction. In such three-layer structure, the reinforcement plate 37 (first metal layer) arranged on the light reception processing section 3 side the most is preferably not grounded, and the reinforcement plate 38 (second metal layer) arranged on the reception side connector section 36 side the most is preferably grounded. FIG. 9 shows a circuit diagram of when the stacked structure shown in FIG. 8B is applied.

As shown in FIG. 9, if the stacked structure of the reinforcement section is the configuration shown in FIG. 8B, a serial coupling of an electrostatic capacitance C1 between the optical element wiring 3a and the reinforcement plate 37, and an electrostatic capacitance C2 between the reinforcement plate 37 and the reinforcement plate 38 is formed. Thus, the parasitic capacitance occurs even if the reinforcement plate 37 arranged on the light reception processing section 3 side the most is not grounded. Such capacitance is expressed as, $$C_{total} = C1 C2/(C1+C2) = C1/(C1/C2+1) \quad (1)$$

In equation (1), $C_{total} \approx C1$ if $C1 \ll C2$, and the parasitic capacitance becomes substantially the same as the capacitance C1 of when the reinforcement plate 37 is grounded. If $C1 < C2$, the parasitic capacitance can be reduced by reducing the C2 (increasing C1/C2).

C1/C2 can be expressed with the following equation (2). In equation (2), S1 is the area of the optical element wiring 3a, S2 is the area of the reinforcement plate 37, and S3 is the area of the reinforcement plate 38. Furthermore, d1 is the distance between the optical element wiring 3a and the reinforcement plate 37, and d2 is the distance between the reinforcement plate 37 and the reinforcement plate 38. Moreover, $\epsilon r1$ is the relative permittivity of the member (specifically, reception side substrate part 35) arranged between the optical element wiring 3a and the reinforcement plate 37, and $\epsilon r2$ is the relative permittivity of the dielectric layer 39 arranged between the reinforcement plate 37 and the reinforcement plate 38.

$$C1/C2 = \epsilon r2/\epsilon r1 \times S1/S2 \times d2/d1 \quad (2)$$

(in the case of S1<S2<S3)

According to equation (2), the electrostatic capacitance C2 can be easily reduced by controlling the dimension of the dielectric layer 39 or the relative permittivity of the material. For instance, the electrostatic capacitance C2 can be easily reduced by making d2 greater than d1, that is, making the distance between the reinforcement plate 37 and the reinforcement plate 38 in the Z-direction longer than the distance between the reinforcement plate 37 and the optical element wiring 3a in the Z-direction. Furthermore, the electrostatic capacitance C2 can be reduced by configuring the dielectric layer 39 with a dielectric material having a relative permittivity of one to two.

Figure 10A:
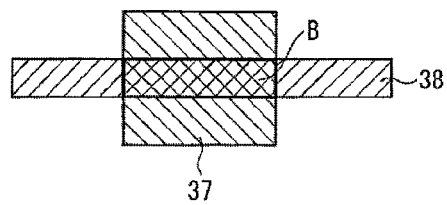
FIGS. 10A and 10B show the positional relationship of two reinforcement plates arranged at the gap portion formed by the back surfaces of the circuit substrates, where

As shown in FIG. 10A, the area of the overlapping portion B of the reinforcement plate 37 and the reinforcement plate 38 is preferably smaller than the reinforcement plate having a smaller area of the areas (S2, S3) of the reinforcement plate 37 or the reinforcement plate 38.

In such configuration, C1/C2 can be expressed with the following equation (3). In the following equation (3), S2, 3 is the area of the overlapping portion B of the reinforcement plate 37 and the reinforcement plate 38.

$$C1/C2 = \epsilon r2/\epsilon r1 \times S1/S2, 3 \times d2/d1 \quad (3)$$

The reinforcement plate 37 is arranged below the light reception processing section 3 due to the bend by the bending portion. The area S2 of the reinforcement plate 37 becomes $C1 = \epsilon r2 S1/d1$ because it is greater than the area S1 of the optical element wiring 3a in the light reception processing section 3.

The area element of C2 is substantially the area S2, 3 of the overlapping portion B of the reinforcement plate 37 and the reinforcement plate 38. Thus, the electrostatic capacitance C can be easily reduced by reducing the area S2, 3 of the overlapping portion B.

Figure 10B:
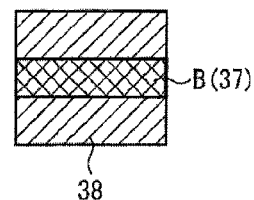

As shown in FIG. 10B, the area of the reinforcement plate 37 is preferably smaller than the area of the reinforcement plate 38. In this case, the reinforcement plate 38 desirably has a shape that covers the entire back surface on the side opposite to the mounting portion of the reception side connector section 36 in the reception side substrate part 35. The reinforcement plate 37 desirably has a shape that covers only the back surface on the side opposite to the mounting portion of the light reception processing section 3 in the reception side substrate part 35. If the reinforcement plate 38 has a shape that covers the entire back surface on the side opposite to the mounting portion of the reception side connector section 36 in the reception side substrate part 35, the shield effect with respect to the EMI from the reception side connector section 36 can be enhanced. On other hand, the serial electrostatic capacitance can be reduced if the reinforcement plate 37 has a shape that covers only the back surface on the side opposite to the mounting portion of the light reception processing section 3 in the reception side substrate part 35, and the area is reduced. Thus, the high speed transmission characteristics by the optical wiring can be enhanced according to the configuration shown in FIG. 10B.

Therefore, the electrostatic capacitance C2 can be easily reduced by controlling the relative permittivity of the dielectric layer 39 and the distance between the reinforcement plate 37 and the reinforcement plate 38 by adopting the stacked structure shown in FIG. 8B. The parasitic capacitance $C_{total}$ caused by the serial connection of the electrostatic capacitances C1 and C2 thus can be reduced.

Regarding the Configuration of Reception Side Substrate Part 35

Figure 11:
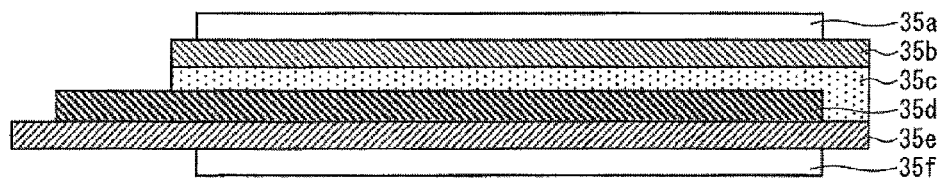
FIG. 11 is a cross-sectional view showing a schematic configuration of the one-sided FPC.

As described above, in the optical transmission module 1, a flexible substrate formed with one layer of wiring layer can be used for the reception side substrate part 35. For instance, the one-sided FPC formed with one layer of wiring layer can be used for the reception side substrate part 35. FIG. 11 is a cross-sectional view showing the schematic configuration of the one-sided FPC.

As shown in FIG. 11, a stacked structure configured by a shield film 35*a*, a cover lay film 35*b*, a cover lay adhesive layer 35*c*, a wiring layer 35*d* serving as a copper foil, a base film 35*e*, and a shield film 35*f* is adopted. The shield films 35*a* and 35*f* are films arranged on the outermost side in the stacked direction, and are made of silver paste. The shield films 35*a* and 35*f* may be configured as metal layers of one part of the stacked structure in the reinforcement section.

Figure 12A:
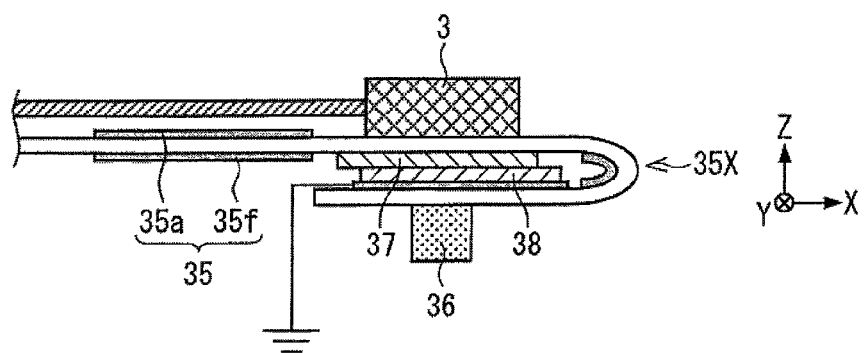
FIG. 12A is a cross-sectional view showing a configuration in the vicinity of the light reception processing section when the reinforcement plate is grounded through the shield film.
Figure 12B:
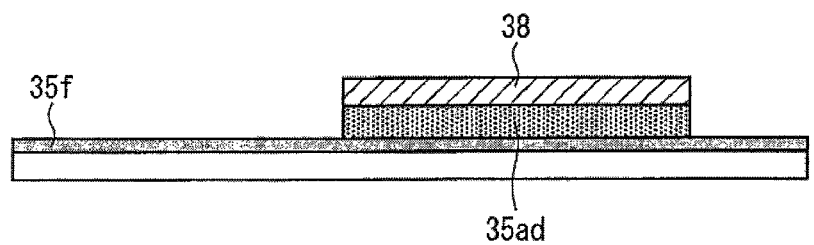
FIGS. 12B and 12C are cross-sectional views showing the configuration in which the reinforcement plate and the shield film are conducted.
Figure 12C:
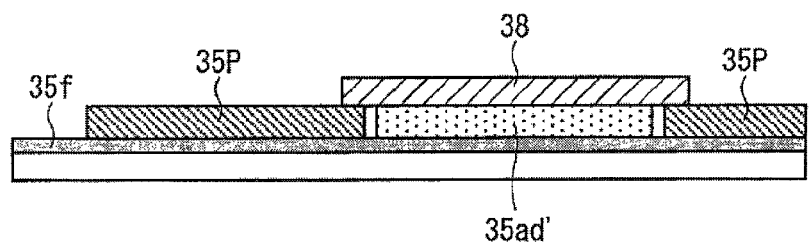

If the reception side substrate part 35 is a one-sided FPC as shown in FIG. 11, the reinforcement plate 38 made of metal can be grounded through the shield film 35*f*. In other words, the reinforcement plate 38 can be grounded by conducting the reinforcement plate 38 and the grounded shield film 35*f*. FIG. 12A is a cross-sectional view showing the configuration in the vicinity of the light reception processing section 3 when the reinforcement plate 38 is grounded through the shield film 35*f*, and FIGS. 12B and 12C are cross-sectional views showing the configuration in which the reinforcement plate 38 and the shield film 35*f* are conducted. In the configuration shown in FIG. 12A, the shield film 35*f* formed on the back surface on the side opposite to the light reception processing section 3 in the reception side substrate part 35 is opened. The reinforcement plate 37 is arranged at such opened portion. The shield film 35*f* formed on the back surface on the side opposite to the reception side connector section 36 in the reception side substrate part 35 remains. The shield film 35*f* is grounded and conducted with the reinforcement plate 38. The grounding of the reinforcement plate 38 can be thereby realized.

As shown in FIG. 12B, the reinforcement plate 38 may be conducted with the shield film 35*f* by being fixed to the shield film 35*f* with a conductive adhesive 35*ad*.

As shown in FIG. 12C, two electrode pads 35P may be arranged in the shield film 35*f* for the conduction of the reinforcement plate 38 and the shield film 35*f*. In the configuration shown in FIG. 12C, the reinforcement plate 38 is conducted with the shield film 35*f* through the electrode pads 35P. The reinforcement plate 38 is fixed to the shield film 35*f* through an adhesive 35*ad'*. The adhesive 35*ad'* is not particularly limited as long as it has a function of being adhered to the shield film 35*f*.

It should be recognized that the characteristic points of the reception unit including the light reception processing section 3, the reception side connector section 36, and the bending portion 35X are also applicable to the transmission unit including the light transmission processing section 2, the transmission side connector section 26, and the bending portion 25X.

Method for Manufacturing Optical Transmission Module 1

The method for manufacturing the optical transmission module includes a mounting stage of mounting the optical wiring 4 on the light transmission processing section 2 and the light reception processing section 3, and a bending stage of bending such that the substrate surfaces of the transmission substrate part 25 and the reception side substrate part 35 oppose each other at the back, and includes an assembly step of assembling the optical transmission module 1 by combining the mounting stage and the bending stage.

Figure 13:
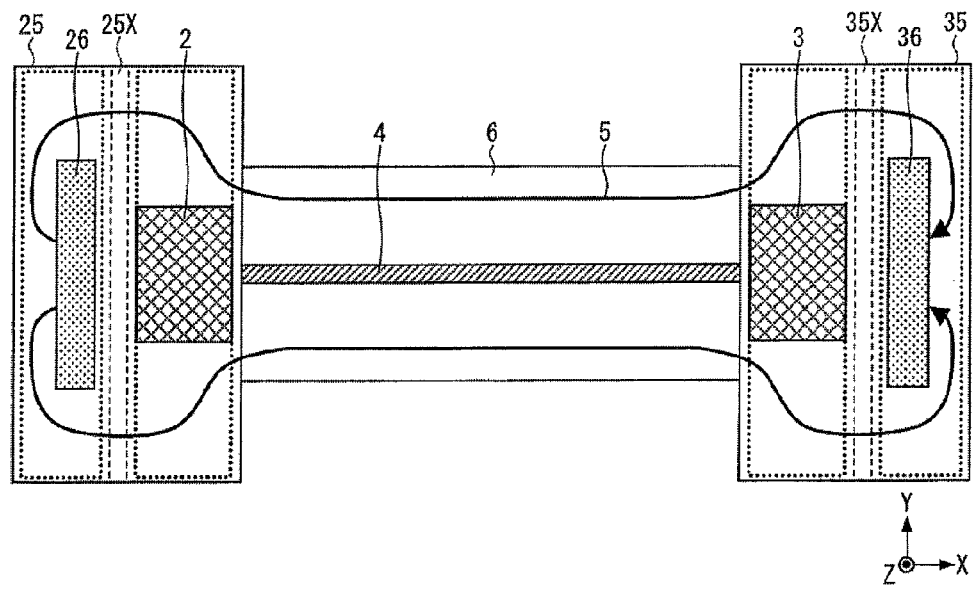
FIG. 13 is a top view for describing the method for manufacturing the optical transmission module shown in FIGS. 1A to 1C.

FIG. 13 is a top view for describing the method for manufacturing the optical transmission module 1 shown in FIGS. 1A to 1C. The optical transmission module 1 shown in FIGS. 1A to 1C has a configuration in which the reception side connector section 36 (or transmission side connector section 26) is arranged on the side opposite to the electric wiring part 6 in the light reception processing section 3 (or light transmission processing section 2), and thus can be assembled in the following procedures.

First, in the mounting stage, the optical wiring 4 is mounted on the light transmission processing section 2 and the light reception processing section 3. After the mounting stage, the bending stage of bending at the bending portion 25X of the transmission side substrate part 25 and the bending portion 35X of the reception side substrate part 35 is carried out.

In the mounting stage, the optical wiring 4 is mounted on the light transmission processing section 2 and the light reception processing section 3 with the circuit substrate, that is, the transmission side substrate part 25, the electric wiring part 6, and the reception side substrate part 35 before the bend in a parallel state. The assembly of the optical transmission module 1 is thereby facilitated.

First Variant

Figure 14:
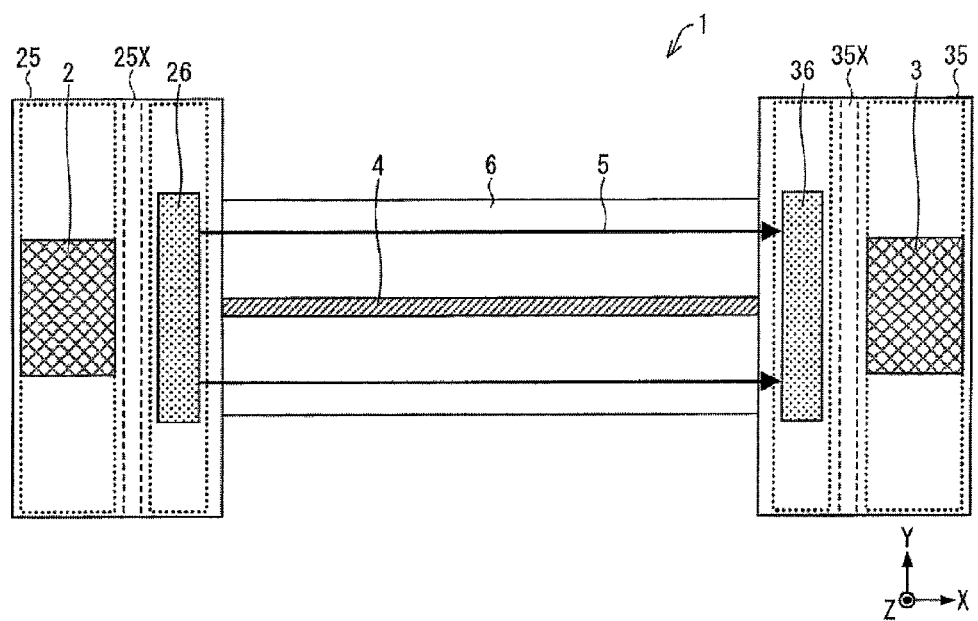
FIG. 14 is a top view showing the configuration of the optical transmission module 1 serving as a first variant.

A variant of the configuration shown in FIGS. 1A to 1C will be described for the configuration of the optical transmission module 1 of the present embodiment. FIG. 14 is a top view showing the configuration of the optical transmission module 1 serving as a first variant. The optical transmission module 1 of the first variant has a configuration in which the positional relationship of the reception side connector section 36 (or transmission side connector section 26) and the light reception processing section 3 (or light transmission processing section 2) with respect to the bending portion 35X (or bending portion 35X) is the opposite of FIGS. 1A to 10. In other words, the light reception processing section 3 (or light transmission processing section 2) is arranged on the side opposite to the electric wiring part 6 in the reception side connector section 36 (or transmission side connector section 26) in the same substrate surface of the reception side substrate part 35 (or transmission side substrate part 25).

Figure 15:
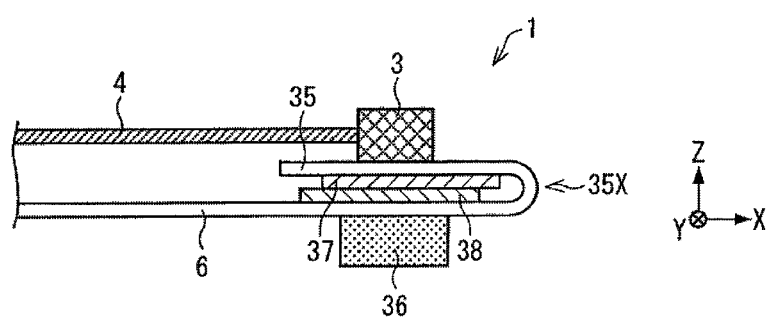
FIG. 15 is a cross-sectional view showing the configuration in the vicinity of the light reception processing section of the optical transmission module according to the first variant in a state bent at the bending portion.

FIG. 15 is a cross-sectional view showing the configuration in the vicinity of the light reception processing section 3 of the optical transmission module 1 according to the first variant in a state bent at the bending portion 35X. As shown in FIG. 15, the light reception processing section 3 and the reception side connector section 36 are arrayed in the Z-direction or the normal direction.

According to the optical transmission module 1 of the first variant shown in FIG. 14 and FIG. 15, the light transmission processing section 2 and the light reception processing section 3 are not interposed between the transmission side connector section 26 and the reception side connector section 36. Thus, the electric wiring 5 for connecting the transmission side connector section 26 and the reception side connector section 36 can be configured only in the electric wiring part 6, and the areas of the transmission side substrate part 25 and the reception side substrate part 35 can be reduced.

In the optical transmission module 1 shown in FIGS. 1A to 1C, the light transmission processing section 2 and the light reception processing section 3 are interposed between the transmission side connector section 26 and the reception side connector section 36. The external connection terminals of the transmission side connector section 26 and the reception side connector section 36 are respectively provided at the opposing positions of the light transmission processing section 2 and the light reception processing section 3 to be mounted to the portable telephone in the bent state. Thus, as shown in FIG. 14, the electric wiring 5 connects the transmission side connector section 26 and the reception side connector section 36 while avoiding the light transmission processing section 2 and the light reception processing section 3. Thus, the electric wiring 5 also needs to be formed in the transmission side substrate part 25 and the reception side substrate part 35 to avoid the light transmission processing section 2 and the light reception processing section 3.

The method for manufacturing the optical transmission module 1 of the first variant will be described below. The optical transmission module 1 of the first variant can be assembled in the following procedures.

In the bending stage, the bending portion 25X of the transmission side substrate part 25 and the bending portion 35X of the reception side substrate part 35 are bent. In the next mounting stage, the optical wiring 4 is mounted on the light transmission processing section 2 and the light reception processing section 3 with the transmission side substrate 25 and the reception side substrate part 35 bent.

Second Variant

Figure 16A:
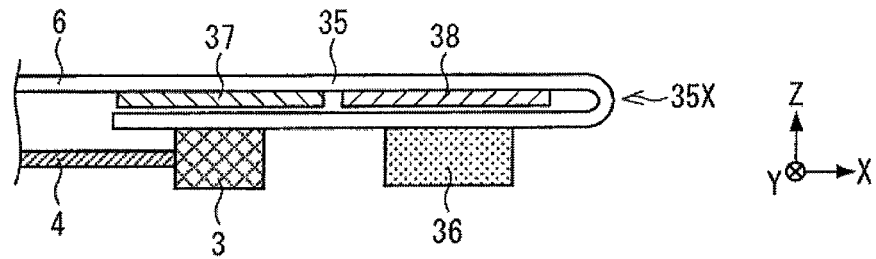
FIGS. 16A to 16C are cross-sectional views showing the configuration in the vicinity of the light reception processing section 3 of the optical transmission module serving as a second variant.
Figure 16B:
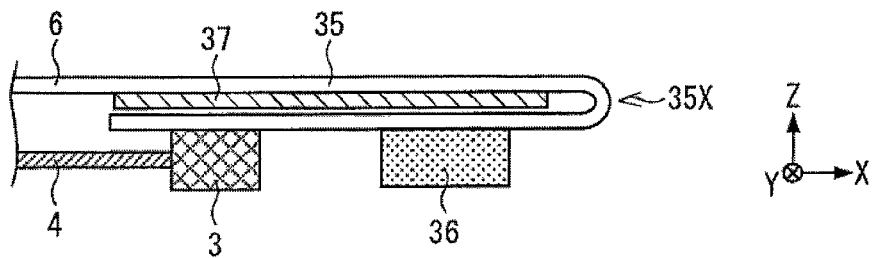
Figure 16C:
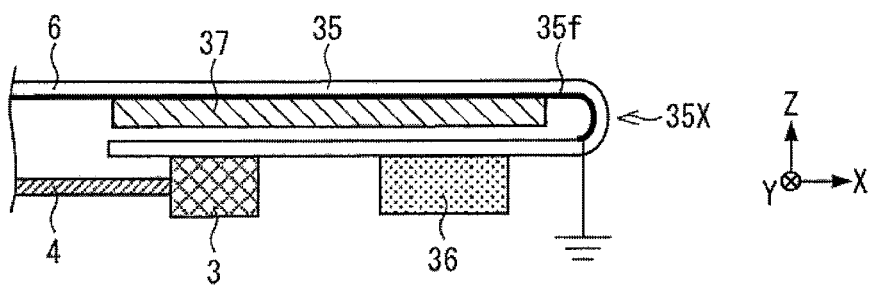

A variant of the configuration shown in FIGS. 1A to 1C will be described for the configuration of the optical transmission module 1 of the present embodiment. FIGS. 16A to 16C are cross-sectional views showing the configuration in the vicinity of the light reception processing section 3 of the optical transmission module 1 serving as a second variant. The optical transmission module 1 of the second variant has a configuration in which the bending portion 35X is not arranged between the light reception processing section 3 and the reception side connector section 36. In other words, the bending portion 35X is arranged on the side opposite to the light reception processing section 3 in the reception side connector section 36 in the same substrate surface of the reception side substrate part 35.

As shown in FIGS. 16A to 16C, the light reception processing section 3 and the reception side connector section 36 are arrayed in the X-direction by bending at the bending portion 35X in the optical transmission module 1 of the second variant. The electric wiring part 6 is arrayed in the Z-direction with the light reception processing section 3 and the reception side connector section 36. The height in the Z-direction can be reduced because the light reception processing section 3 and the reception side connector section 36 are arrayed in the X-direction in the optical transmission module 1 of the second variant. Therefore, lower height of the entire module can be realized in the optical transmission module 1 of the second variant.

As shown in FIG. 16A, the reinforcement plates 37 and 38 are arranged in the gap portion (gap portion formed by the back surfaces of the substrate surfaces) formed by the bend by the bending portion 35X as reinforcement sections for reinforcing the light reception processing section 3 and the reception side connector section 36.

The reinforcement section for reinforcing the light reception processing section 3 and the reception side connector section 36 is not limited to the configuration shown in FIG. 16A. As shown in FIG. 16B, one reinforcement plate 37 may be arranged to correspond to the light reception processing section 3 and the reception side connector section 36. The reinforcement plate 37 may be grounded by being connected to the shield layer 35f formed in the reception side substrate part 35, as shown in FIG. 16C.

Third Variant

Figure 17A:
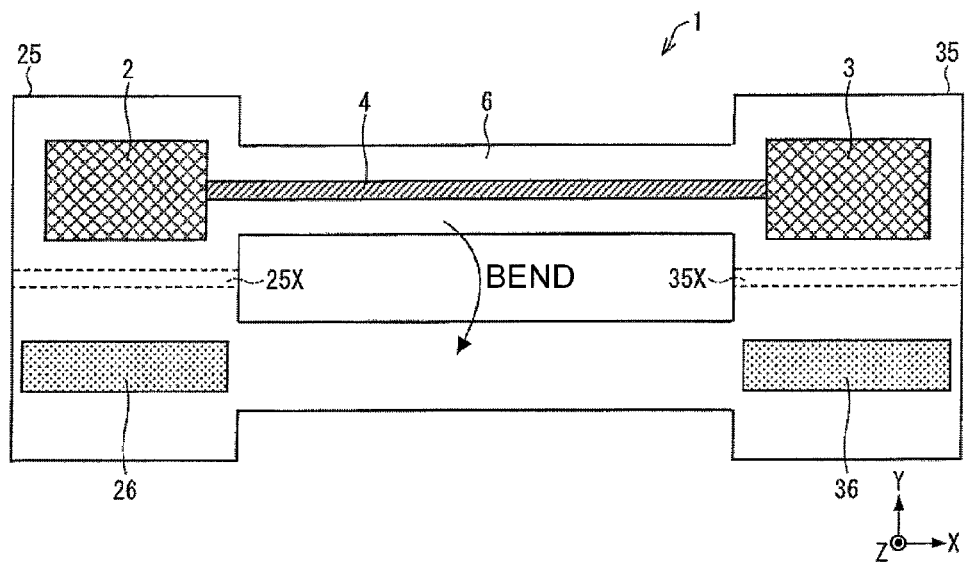
FIGS. 17A and 17B show the configuration of the optical transmission module serving as a third variant, where
Figure 17B:
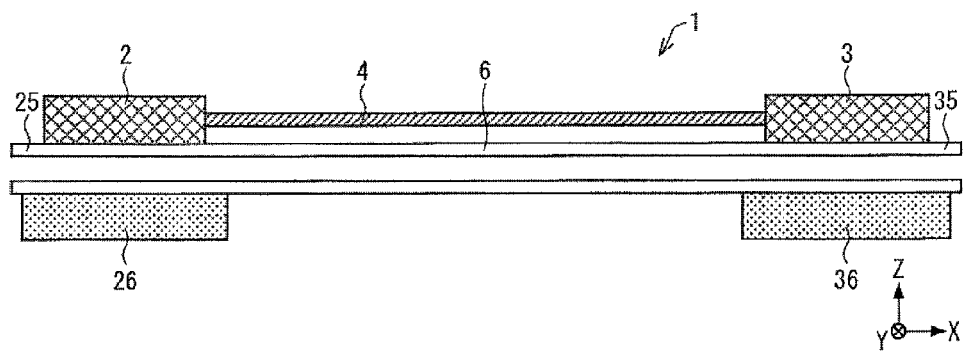

A variant of the configuration shown in FIGS. 1A to 1C will be described for the configuration of the optical transmission module 1 of the present embodiment. FIGS. 17A and 17B show the configuration of the optical transmission module 1 serving as a third variant, where FIG. 17A is a top view and FIG. 17B is a cross-sectional view showing a state bent at the bending portion.

As shown in FIG. 17A, the light transmission processing section 2 and the transmission side connector section 26 are lined in the Y-direction, and the bending portion 25X is formed between the light transmission processing section 2 and the transmission side connector section 26 in the transmission side substrate part 25 in the optical transmission module 1 of the third variant. In the transmission side substrate part 35, the light reception processing section 3 and the reception side connector section 36 are lined in the Y-direction, and the bending portion 35X is formed between the light reception processing section 3 and the reception side connector section 36. The bending portions 25X and 35X are both formed in the X-direction.

As shown in FIG. 17B, the light transmission processing section 2 and the transmission side connector section 26 are arrayed in the Z-direction or the normal direction in a state bent at the bending portion 25X. In a state bent at the bending portion 35X, the light reception processing section 3 and the reception side connector section 36 are arrayed in the Z-direction or the normal direction. With such configuration, the electric wiring part including a great number of electric wiring becomes slim.

Fourth Variant

Figure 18A:
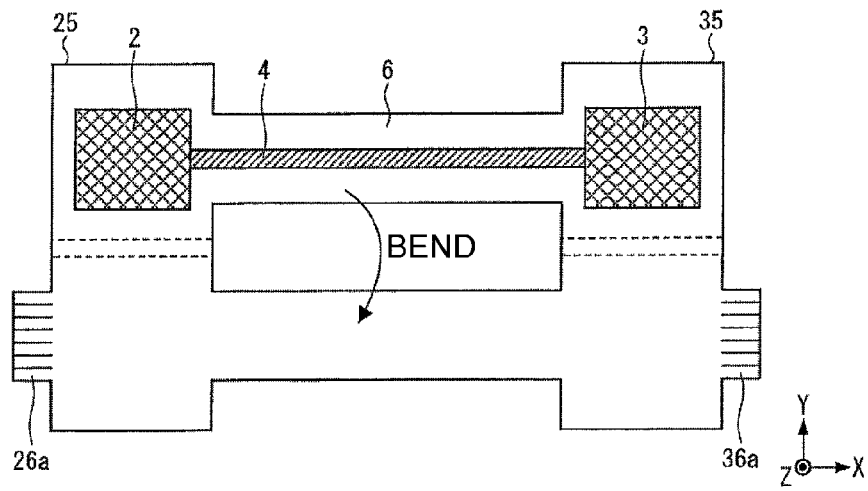
FIGS. 18A to 18C show the configuration of the optical transmission module serving as a fourth variant, where
Figure 18B:
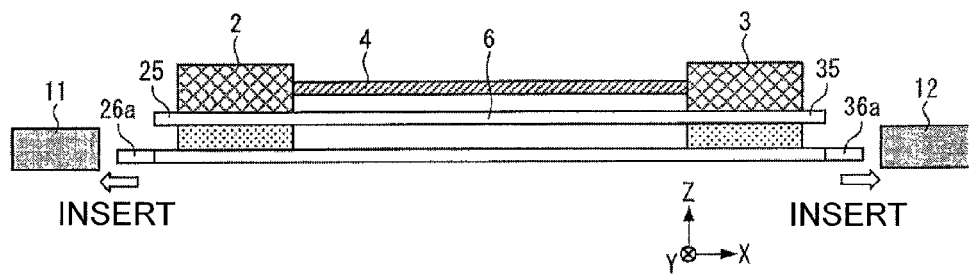
Figure 18C:
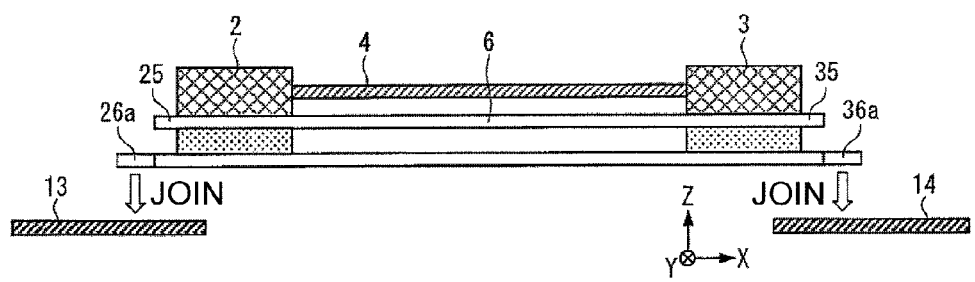

A variant of the configuration shown in FIGS. 17A and 17B will be described for the configuration of the optical transmission module 1 of the present embodiment. FIGS. 18A to 18C show the configuration of the optical transmission module 1 serving as a fourth variant, where FIG. 18A is a top view and FIGS. 18B and 18B are cross-sectional views showing a connection state in a state bent at the bending portion.

As shown in FIG. 18A, the optical transmission module 1 of the fourth variant includes contacts 26a and 36a. The contact 26a is formed to project out in the light transmitting direction of the optical wiring 4 from the transmission side substrate part 25. The contact 36a is formed to project out in the light transmitting direction of the optical wiring 4 from the reception side substrate part 35. The surface on the light transmission processing section 2 side in the contact 26a and the surface on the light reception processing section 3 side in the contact 36a are formed with a wiring pattern. Thus, the wiring pattern forming surfaces in the contacts 26a and 36a are opposed to the mounting surface of the light transmission processing section 2 and the light reception processing section 3.

Because the wiring pattern forming surfaces in the contacts 26a and 36a oppose the mounting surfaces of the light transmission processing section 2 and the light reception processing section 3, the contacts 26a and 36a can be inserted and connected in the light transmitting direction (X-direction) with respect to the FPC connectors 11 and 12, as shown in FIG. 18B. In this case, the contacts 26a and 36a and the FPC connectors 11 and 12, which connect to the contacts, configure a "connecting section".

As shown in FIG. 18C, the substrates 13 and 14 may be installed to face the wiring pattern forming surfaces in the contacts 26a and 36a, and the contacts 26a and 36a and the substrates 13 and 14 may be ACF-connected. In this case, the height of the optical transmission module 1 can be further lowered.

Application Example

The optical transmission module 1 of the present embodiment can be applied to the following application examples. The above-described embodiment has been described using an example of being applied to the portable telephone 40 for the application example, but is not limited thereto, and may be applied to a slide mechanism etc. of a slide-type electronic device such as a slide-type PHS (Personal Handy phone System), a slide-type PDA (Personal Digital Assistant), and a slide-type notebook personal computer.

For further application examples, the optical transmission module 1 can be applied to a device including a drive unit such as a printer head in a printing device (electronic device) or a reading unit in a hard disc recording and reproducing device.

Figure 19A:
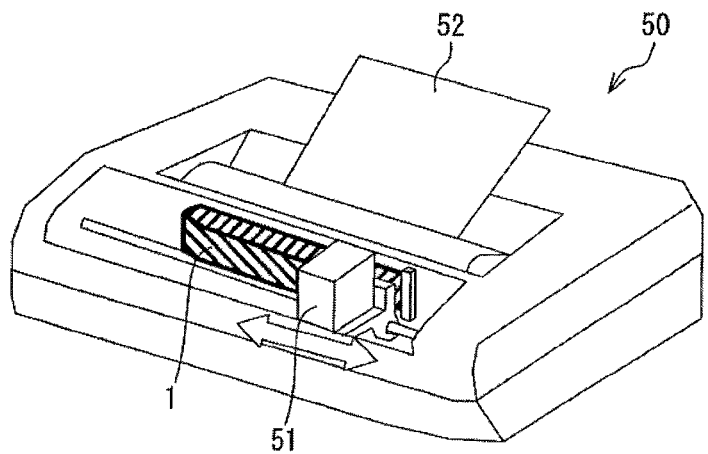
FIG. 19A is a perspective view showing an outer appearance of a printing device including the optical transmission module according to one or more embodiments of the present invention.
Figure 19B:
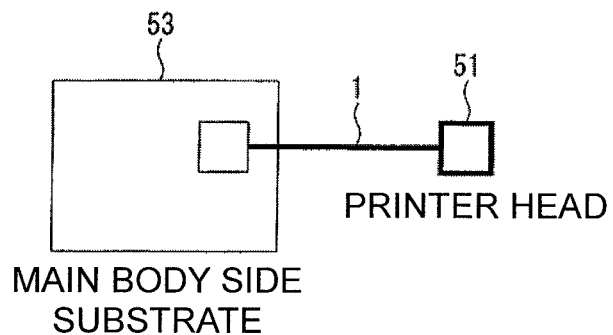
FIG. 19B is a block diagram showing the main parts of the printing device shown in FIG. 19A, and FIGS. 19C and 19D are perspective views showing a curved state of the optical transmission path when the printer head is moved (driven) in the printing device.
Figure 19C:
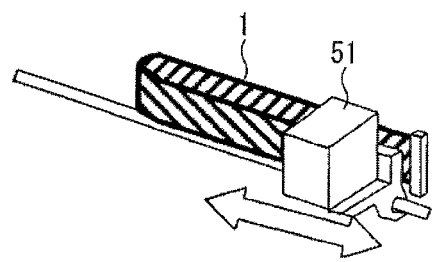

FIGS. 19A to 19C show an example in which the optical transmission module 1 is applied to a printing device 50. FIG. 19A is a perspective view showing an outer appearance of the printing device 50. As shown in the figure, the printing device 50 includes a printer head 51 for performing printing on a paper 54 while moving in a width direction of the paper 54, and one end of the optical transmission module 1 is connected to the printer head 51.

FIG. 19B is a block diagram of the portion applied with the optical transmission module 1 in the printing device 50. As shown in the figure, one end of the optical transmission module 1 is connected to the printer head 51, and the other end is connected to the main body side substrate in the printing device 50. The main body side substrate includes a control unit for controlling the operation of each unit of the printing device 50, and the like.

Figure 19D:
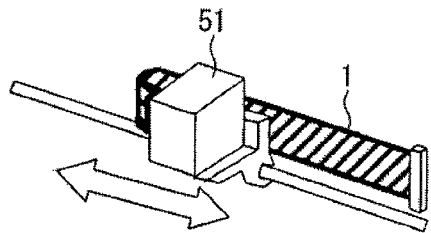

FIGS. 19C and 19D are perspective views showing a curved state of the optical wiring 4 of when the printer head 51 is moved (driven) in the printing device 50. As shown in the figure, when applying the optical wiring 4 to the drive unit such as the printer head 51, the curved state of the optical wiring 4 changes by the drive of the printer head 51, and each position of the optical wiring 4 is repeatedly curved.

Therefore, the optical transmission module 1 according to the present embodiment is suitable for such drive units. The high speed and large capacity communication using the drive unit can be realized by applying the optical transmission module 1 to the drive unit.

Figure 20:
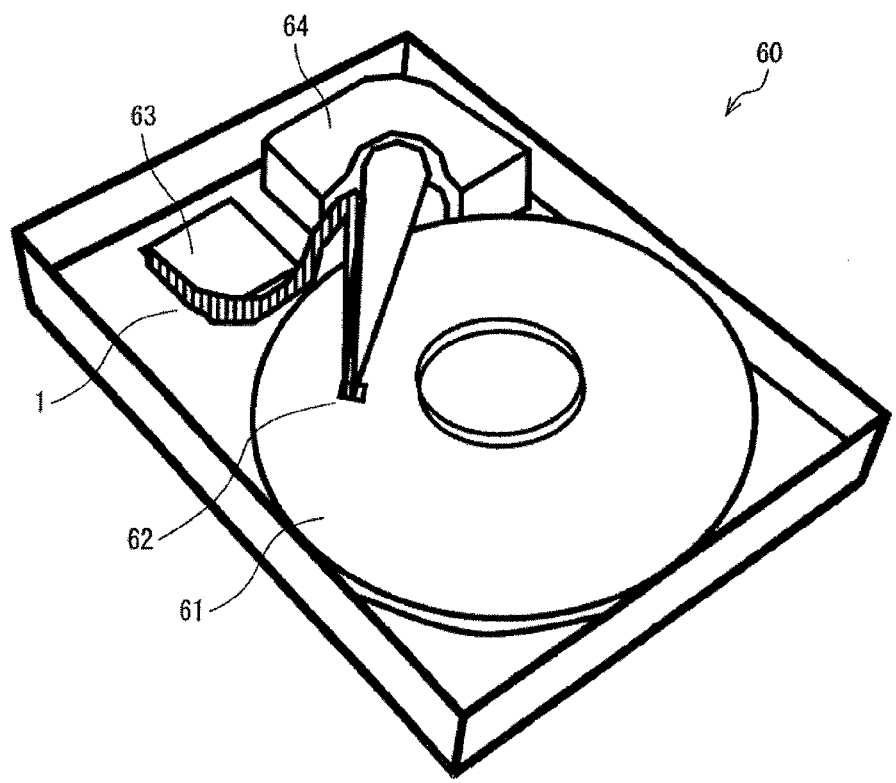
FIG. 20 is a perspective view showing an outer appearance of a hard disc recording and reproducing device including the optical transmission module according to the present embodiment.
Figure 21:
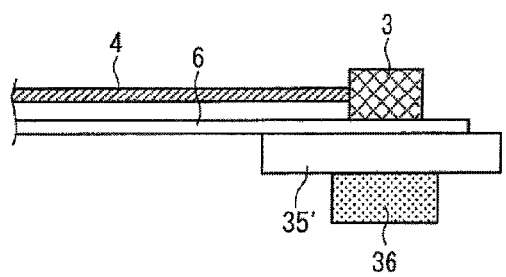
FIG. 21 is a cross-sectional view schematically showing a configuration of a conventional optical transmission module.

FIG. 20 shows an example in which the optical transmission module 1 is applied to a hard disc recording and reproducing device 60.

As shown in the figure, the hard disc recording and reproducing device 60 includes a disc (hard disc) 61, a head (reading and writing head) 62, a substrate introducing unit 63, a drive unit (drive motor) 64, and the optical transmission module 1.

The drive unit 64 drives the head 62 along the radial direction of the disc 61. The head 62 reads the information recorded on the disc 61, and also writes the information on the disc 61. The head 62 is connected to the substrate introducing unit 63 by way of the optical transmission module 1, and propagates the information read from the disc 61 to the substrate introducing unit 63 as an optical signal or receives the optical signal of the information to be written to the disc 61 propagated from the substrate introducing unit 63.

The high speed and large capacity communication can be realized by applying the optical transmission module 1 to the drive unit such as the head 62 in the hard disc recording and reproducing device 60.

In addition to the application examples described above, the optical transmission module 1 of the present embodiment can also be used in signal transmission between information terminals and substrates of a video camera, a notebook personal computer, and the like.

The embodiments of the present invention will be further described in detail below with examples. It should be recognized that the present invention is not limited to the following examples, and various modifications can be made on the details. Furthermore, the present invention is not limited to the above-described embodiments and various modifications can be made within the scope defined in the Claims, where the embodiments obtained by appropriately combining the technical means disclosed in each embodiment are also encompassed in the technical scope of the present invention.

INDUSTRIAL APPLICABILITY

One or more embodiments of the present invention can be applied to the optical communication path between the various types of devices, and can also be applied to a flexible optical wiring serving as an in-device wiring mounted in a compact and thin commercial-off-the-shelf device.

What is claimed is:

1. An optical transmission module comprising:
an optical module section comprising at least one of a reception module for converting an optical signal transmitted by an optical wiring to an electric signal or a transmission module section for converting the electric signal to the optical single and transmitting the optical signal through the optical wiring;
a circuit substrate comprising an electric wiring for transmitting the electric signal; and
a connecting section comprising an external connection terminal for providing the electric signal to the optical module section and the circuit substrate,
wherein the optical module section and the connecting section being mounted on a same substrate surface of the circuit substrate,
wherein the circuit substrate further comprises a bending portion bent so that the substrate surfaces oppose each other at the back in a normal direction,
wherein the bending portion is arranged between the optical module section and the connecting section,
wherein the optical module section and the connecting section are arranged in a normal direction of the circuit substrate due to the bend at the bending portion,
wherein a plate-shaped reinforcement section for reducing an electrical coupling between the optical module section and the connecting section is arranged in a gap portion formed by the back surfaces of the substrate surfaces,
wherein the reinforcement section comprises a three-layer structure in which a dielectric layer made of a dielectric body, and two metal layers made of metal for sandwiching the dielectric layer are stacked in the normal direction,
wherein a first metal layer mostly arranged on the optical module section side is not grounded, and a second metal layer mostly arranged on the connecting section side is grounded, and
wherein the optical module section comprises:
an optical element for receiving the optical signal transmitted through the optical wiring or emitting the optical signal to the optical wiring;
a control unit for amplifying the optical signal received by the optical element or driving the light emission of the optical signal to the optical wiring; and an optical element wiring for connecting the optical element and the control unit, wherein a distance in the normal direction of the first and second metal layers is longer than a distance in the normal direction of the first metal layer and the optical element wiring.

2. The optical transmission module according to claim 1, wherein the reinforcement section has a stacked structure stacked in the normal direction, the stacked structure including at least one metal layer.

3. The optical transmission module according to claim 2, wherein a first metal layer mostly arranged on the optical module section side of the metal layer is not grounded.

4. The optical transmission module according to claim 2, wherein a second metal layer mostly arranged on the connecting section side of the metal layer is grounded.

5. The optical transmission module according to claim 1, wherein the dielectric layer is configured by a dielectric material with relative permittivity of one to two.

6. The optical transmission module according to claim 1, wherein an overlapping portion of the first and second metal layers seen from the normal direction has a smaller area than the metal layer having a smaller area of the first and second metal layers.

7. The optical transmission module according to claim 1, wherein the circuit substrate includes a grounded shield layer on a surface, and wherein the second metal layer is conducted with the shield layer.

8. The optical transmission module according to claim 1, wherein the connecting section is arranged on a side opposite to the electric wiring in the optical module section at the same substrate surface of the circuit substrate.

9. The optical transmission module according to claim 1, wherein the optical module section is arranged on a side opposite to the electric wiring in the connecting section at the same substrate surface of the circuit substrate.

10. The optical transmission module according to claim 1, wherein the bending portion is arranged on a side opposite to the optical module section in the connecting section at the same substrate surface of the circuit substrate.

11. An electronic device comprising the optical transmission module according to claim 1.

12. A method for manufacturing an optical transmission module including, an optical module section comprising at least one of a reception module for converting an optical signal transmitted by an optical wiring to an electric signal or a transmission module section for converting the electric signal to the optical single and transmitting the optical signal through the optical wiring;

a circuit substrate including an electric wiring for transmitting the electric signal; and a connecting section including an external connection terminal for providing the electric signal to the optical module section and the circuit substrate, wherein the optical module section and the connecting section are mounted on a same substrate surface of the circuit substrate, and wherein the method comprises the step of:

assembling the optical transmission module by combining a mounting stage of mounting the optical wiring on the optical module section; and bending the circuit substrate, in a bending stage, so that the substrate surface oppose each other at the back in a normal direction of the circuit substrate.

13. The method for manufacturing the optical transmission module according to claim 12, wherein the mounting stage is performed with the circuit substrate bent after the bending stage in the assembly step.

14. The method for manufacturing the optical transmission module according to claim 12, wherein the bending stage is performed with the optical wiring mounted on the optical module section after the mounting stage in the assembly step.

* * * * *